US006009617A

United States Patent [19]

Fan

[11] Patent Number: 6,009,617

[45] Date of Patent: Jan. 4, 2000

[54] COMPUTER KEYBOARD ASSEMBLING APPARATUS

[75] Inventor: Jackley Fan, Chung Li, Taiwan

[73] Assignee: Behavior Tech Computer Corporation, Taipei, Taiwan

[21] Appl. No.: 09/052,953

[22] Filed: Apr. 1, 1998

[51] Int. Cl.[7] .......... B23P 21/00

[52] U.S. Cl. .......... 29/714; 29/729; 29/760; 29/622; 200/517

[58] Field of Search .......... 29/714, 622, 756, 29/729, 760; 200/512, 517, 5 A

[56] References Cited

U.S. PATENT DOCUMENTS 4,851,618 7/1989 Amino et al. .......... 200/5

*Primary Examiner*—P. W. Echols
*Assistant Examiner*—John C. Hong
*Attorney, Agent, or Firm*—Rosenberg, Klein & Lee

[57] ABSTRACT

A computer keyboard assembling apparatus includes a holding plate, a support plate and a pushing mechanism all mounted on a work table. The holding plate is movable relative to the support plate to hold the a metal plate and an insulation pad that are received within a keyboard support tray positioned on the support plate in position. The movement of the holding plate also triggers a micro-switch to actuate the pushing mechanism to apply a force to the metal plate through a side opening formed on the keyboard support tray so as to horizontally move the metal plate relative to the insulation pad to have engaging members thereof engaging and secured to each other.

1 Claim, 5 Drawing Sheets

COMPUTER KEYBOARD ASSEMBLING APPARATUS

FIELD OF THE INVENTION

The present invention relates generally an apparatus for assembling computer keyboard, especially notebook computer, and in particular to an apparatus which automatically operates to mount the insulation pad and metal plate of the computer keyboard together so as to allow operators to readily proceed with further assembling operation on the keyboard.

BACKGROUND OF THE INVENTION

Personal computers, especially notebook computers, are getting smaller and more compact which makes the computers more easy to carry by individuals. However, this increases the difficult of the assembling operation of the keyboard. Conventionally, all the parts of the keyboard are assembled together by human labor, wherein a metal plate is to be mounted to an insulation pad by having a number of engaging members provided on the metal plate precisely engage counterpart engaging members on the insulation pad to provide a flat keyboard base plate formed by the metal plate and the insulation pad secured together. If any of the engaging members is not correctly engaged by the counterpart engaging member, then the keyboard base plate will not be flat as desired and problems occur in the following assembling steps which in turn causes defect product and/or lowers down the manufacturing efficiency.

In view of the problem, the present invention provides a computer keyboard assembling apparatus which operates automatically to precisely, correctly and efficiently mount the insulation pad to the metal plate so as to allow the operators to readily mount keys of the keyboard thereto in the subsequent assembling operation.

SUMMARY OF THE INVENTION

Thus, a primary object of the present invention is to provide a computer keyboard assembling apparatus, comprising a holding plate, a support plate and a pushing mechanism which are all mounted on a common work table to form the assembling apparatus which allows a keyboard support tray to be positioned on the support plate for receiving and holding therein the metal plate and the insulation pad and to have the metal plate and the insulation pad to be mounted to each other by means of a single operation that moves the metal plate relative to the insulation pad so as to prevent any potential error in the engagement therebetween to increase the assembling efficiency of the computer keyboard.

Another object of the present invention is to provide a computer assembling apparatus which is simple in both structure and operation, wherein by means of up-and-down direction pressurization, the metal plate and the insulation are held in snug and precise contact with each other and further by means of horizontal pushing operation, the two are moved relative to each other and engaged by each other so that a precise and effective assembling operation may be achieved.

BRIEF DESCRIPTION OF THE DRAWINGS

The above and other objects, advantages and features of the present invention will be readily apparent from the following detailed description of a preferred embodiment of the invention, with reference to the accompanying drawings, wherein.

DETAILED DESCRIPTION OF THE PREFERRED EMBODIMENT

Figure 1:
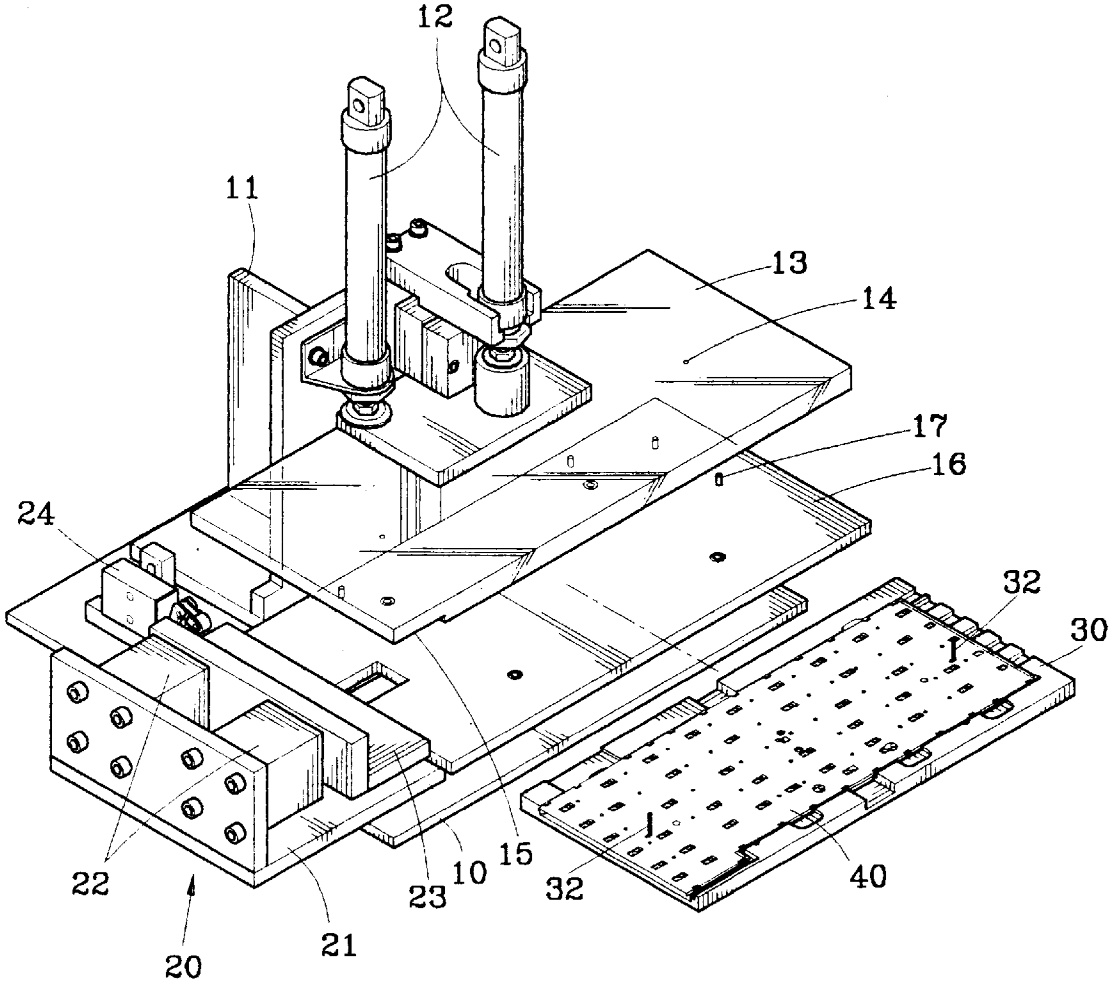
FIG. 1 is a perspective view showing a computer keyboard assembling apparatus constructed in accordance with the present invention.

With reference to the drawings and in particular to FIG. 1 which shows a perspective view of a computer keyboard assembling apparatus constructed in accordance with the present invention, the apparatus comprises a holding plate 13, a support plate 16 and a pushing mechanism 20, all mounted on a common work table 10, and a keyboard support tray 30 which is positionable on the support plate 16.

Figure 2:
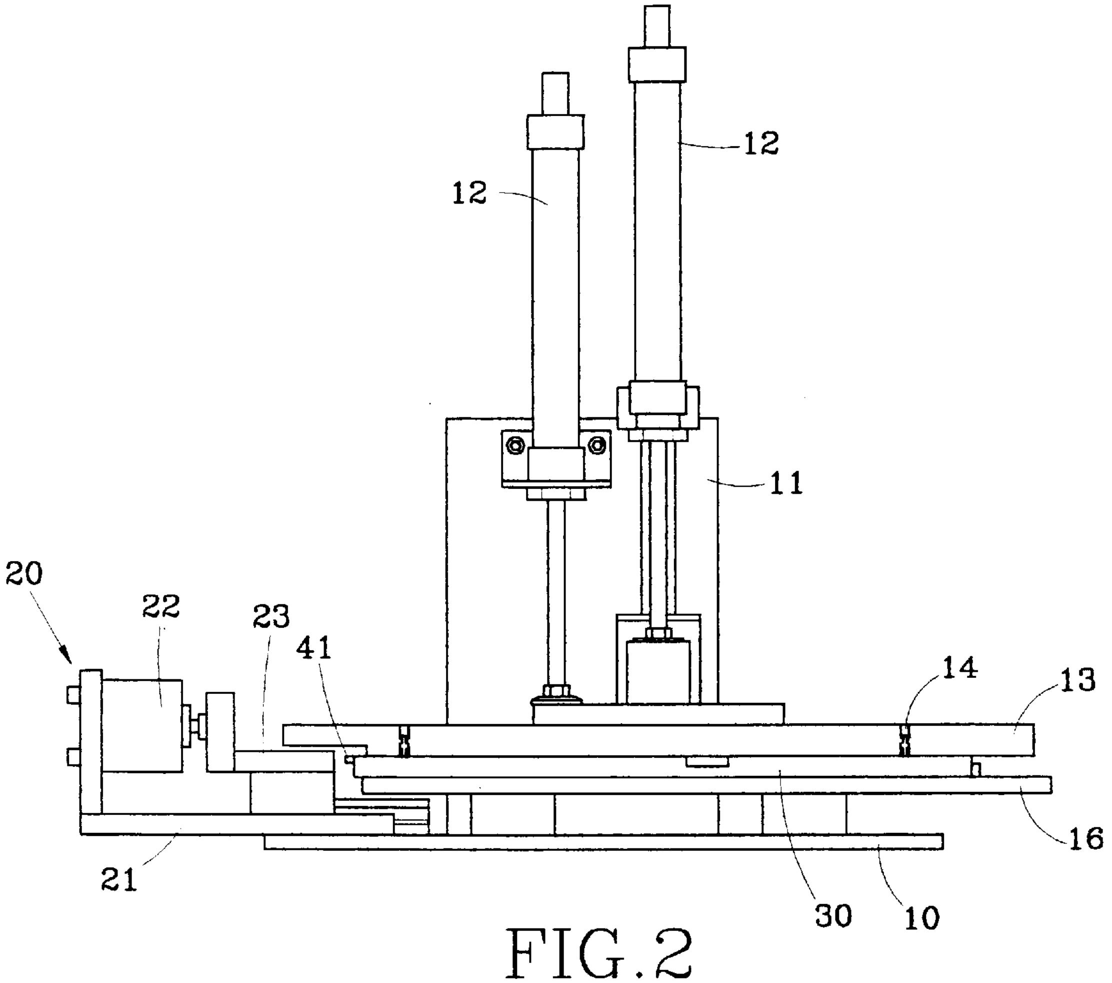
FIG. 2 is a front view of the computer keyboard assembling apparatus of the present invention.

As shown in FIGS. 1 and 2, the work table 10 comprises a flat member adapted to be mounted at any suitable position along an assembly line. The work table 10 comprises a longitudinal plate 11 that is located at rear side thereof. The plate 11 has power cylinders 12 mounted on top end thereof to have the cylinder rods of the cylinders 12 facing downward for supporting thereon the holding plate 13.

The holding plate 13, that is fixed on remote end of the cylinder rods of the power cylinders 12, comprises a plurality of reference holes 14 formed on suitable positions thereon. The holding plate 13 further comprises a recessed section 15 formed on one side thereof which defines a space sized to accommodate the lateral movement of a movable block 23 of the pushing mechanism 20 which will be further discussed.

The support plate 16 is fixed on the surface of the work table 10 and opposite to the holding plate 13 to define therebetween a clamping space for receiving the keyboard support tray therein. The support plate 16 has a plurality of dwell pins 17 provided thereon for precisely and correctly positioning the keyboard support tray 30 which is positioned on the support plate 16. When the holding plate 13 is driven down toward the support plate 16 by means of the power cylinders 12, the holding plate 13 is moved into contact and pressing engagement with the keyboard support tray 30 to securely clamp it between the holding plate 13 and the support plate 16.

The pushing mechanism 20 is arranged at one side of the work table 10 and comprises a base 21, power cylinders 22, a movable block 23 and a micro-switch 24. The base 21 is fixed to the work table 10 with the power cylinders 22 fixed thereon. The power cylinders 22 have cylinder rods with the movable block 23 fixed to remote ends of the rods. The micro-switch 24 is arranged at the rear side of the movable block 23 and fixed on the work table 10 in such a position that the downward movement of the holding plate 13 triggers the switch 24 to actuate the power cylinders 22 for horizontally moving the movable block 23 into the recessed section 15 of the holding plate 13 to apply a pushing force to a plate-like keyboard part 40 that is positioned in the keyboard support tray 30.

Figure 3:
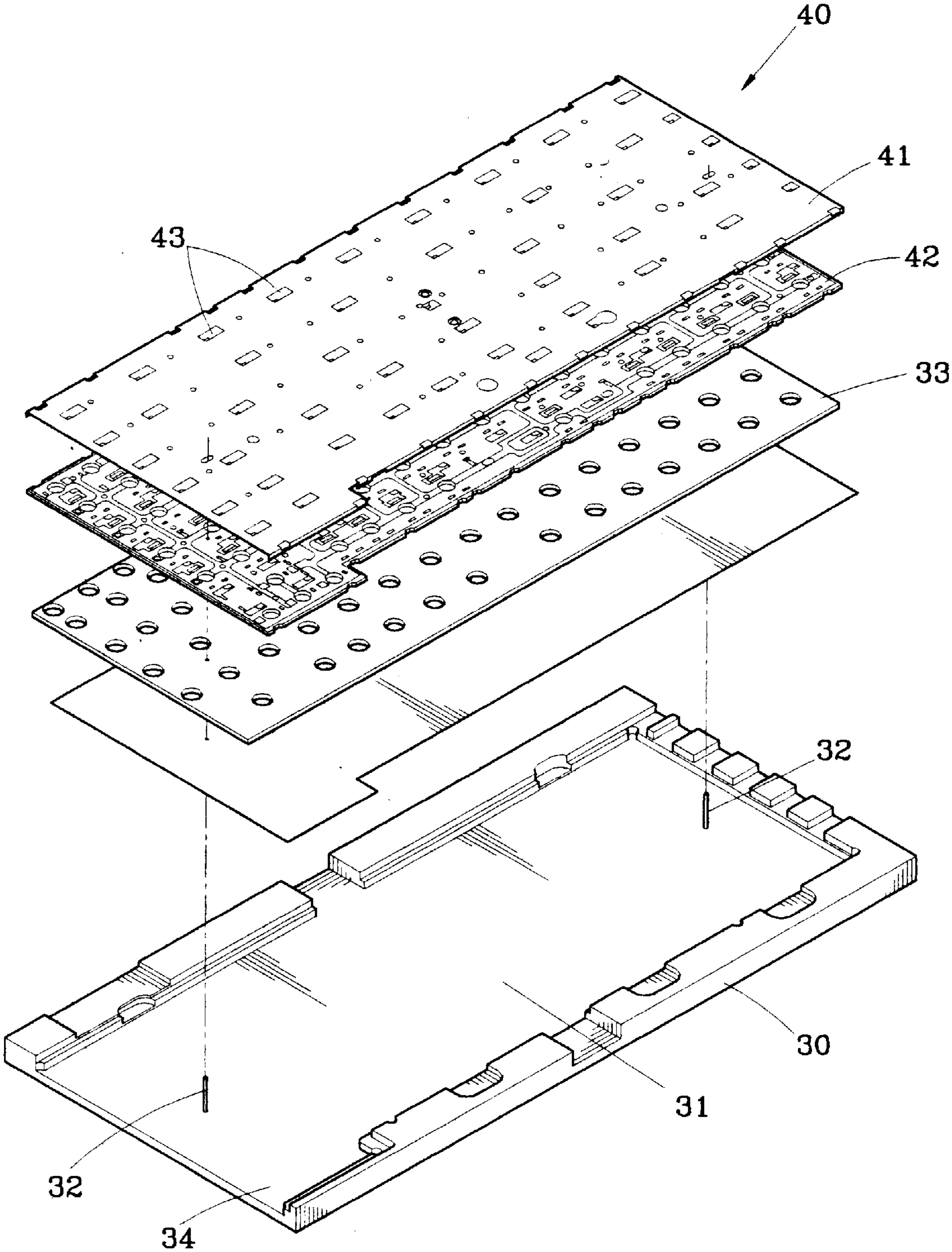
FIG. 3 is an exploded perspective view showing a keyboard support tray together with keyboard parts.
Figure 4:
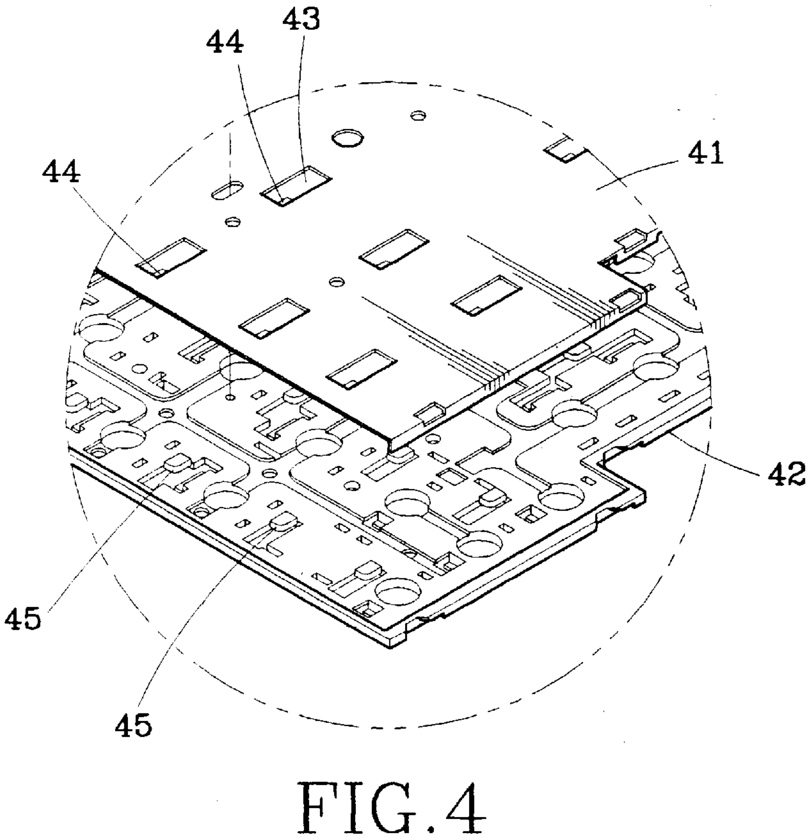
FIG. 4 is a partial perspective view showing a portion of the keyboard parts before assembled.

As shown in FIG. 3, the keyboard support tray 30 comprises a tray-like member, defining a recessed cavity 31 having an open side 34. The recessed cavity 31 has two reference pins 32 located therein at suitable positions. The cavity 31 is sized to receive therein the a cushion pad 33 and the keyboard part 40 that partly constitutes a keyboard. In positioning the cushion pad 33 and the keyboard part 40 into the cavity 31, the reference pins 32 should be aligned with and fit over by reference holes provided on both the cushion pad 33 and the keyboard part 40 in order to correctly position the cushion pad 33 and the keyboard part 40 inside the cavity 31.

As shown in FIGS. 4–7, the keyboard part 40 comprises a metal plate 41, serving as a common contact of keys 50 (see FIG. 7) of the keyboard to be assembled and an insulation pad 42 for holding the keys 50 of the keyboard. The metal plate 41 has a plurality of connecting openings 43 formed thereon, each of the connecting opening 43 has an engaging member 44 formed on a corner thereof. Corresponding to the engaging members 44, the insulation pad 42 has a plurality of counterpart engaging members 45 formed thereon which are to be engaged by the respective engaging members 44 of the metal plate 41 so as to fix the insulation pad 42 to the metal plate 41 in assembling the keyboard part 40.

Figure 5:
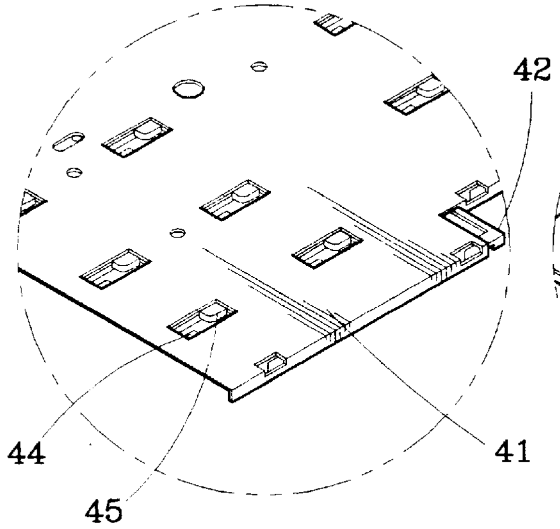
FIG. 5 is a partial perspective view showing a portion of the keyboard parts which are in contact with each other but not engaged by each other.
Figure 6:
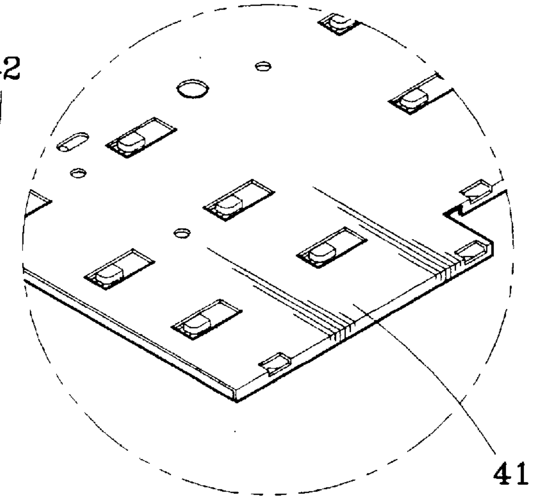
FIG. 6 is a partial perspective view showing a portion of the keyboard parts which are engaged by each other.

In using the present inventive apparatus to assemble the keyboard part 40 described above, the insulation pad 42 and the metal plate 41 are positioned into the cavity 31 of the keyboard support tray 30 and the keyboard support tray 30, together with the insulation pad 42 and the metal plate 41 therein, is then placed on the support plate 16 and precisely positioned by means of the dwell pins 17. At this moment, the insulation pad 42 and the metal plate 41 that are positioned in the cavity 31 in accordance with the reference pins 32 of the keyboard support tray 30 have not yet been engaged by each other and the metal plate 41 is sized and positioned to have one side edge thereof projecting beyond the cavity 31 through the opening 34 thereof, as shown in FIG. 2. The holding plate 13 is then driven downward to have the reference holes 14 of the holding plate 13 correctly fit over the reference pins 32 and the downward movement of the holding plate 13 brings the holding plate 13 into contact with the keyboard support tray 30, effectively holding the metal plate 41 and the insulation pad 42 in the cavity 31 of the keyboard support tray 30 in a flat and precisely-positioned condition, as shown in FIG. 5. Further downward movement of the holding plate 31 triggers the micro-switch 24 which actuates the pushing mechanism 20 to move the movable block 23 to perform a pushing operation. During the pushing operation, the movable block 23 is driven to have a front edge thereof moved into the recessed section 15 of the holding plate 13 and getting closer to the side opening 34 of the cavity 31 of the keyboard support tray 30. This brings the front edge of the movable block 23 into contact with the edge of the metal plate 41 that projects beyond the cavity 31 through the side opening 34 and thus applies a pushing force to the metal plate 41 to drive the metal plate 41 inward relative to the cavity 31, while the insulation pad 42 is kept fixed. The metal plate 41 and the insulation pad 42 are positioned so that the inward movement of the metal plate 41 makes the engaging members 44 that are provided on the metal plate 41 engaging the respective counterpart engaging member 45 of the insulation pad 42, as shown in FIG. 6 and thus correctly mounting the metal plate 41 and the insulation pad 42 together.

Figure 7:
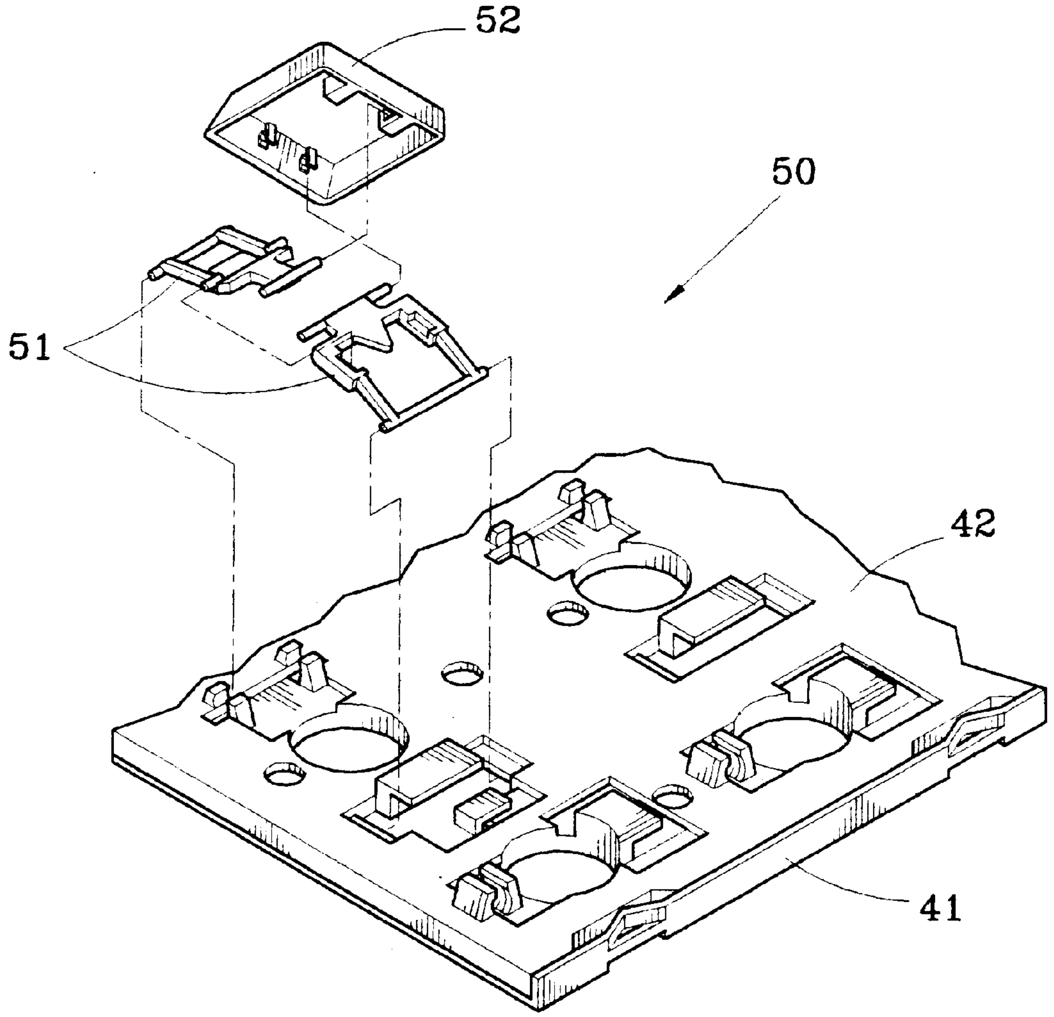
FIG. 7 is a partial perspective view showing a portion of the assembled keyboard parts which allow keys to be readily mounted thereto.

The metal plate 41 and the insulation pad 42 so mounted together provide a flat keyboard base plate, as shown in FIG. 7, which allows the keys 52, as well as key supports 51, to be readily mounted thereto so as to significantly simplify the assembling operation of the computer keyboard.

Thus, as described above, the assembling apparatus of the present invention is capable to have the metal plate and the insulation pad quickly and precisely mounted to each other, eliminating the potential errors that may occur in the assembling operation and increasing the manufacturing efficiency of the computer keyboard. Further, the overall structure of the present inventive apparatus is not complicated at all, but may provide a precise and correct assembling operation.

The above description is made with respect to the preferred embodiment of the present invention and for those skilled in the art, it is possible to made a variety of modifications and changes to the above-described embodiment without departing from the scope and spirit of the present invention. All these modifications and changes should be considered within the scope of the present invention as defined in the appended claims.

What is claimed is:

1. A computer keyboard assembling apparatus, comprising a holding plate, a support plate and a pushing mechanism commonly mounted on a work table and a keyboard support tray positionable on the support plate, the keyboard support tray comprising a tray-like member defining therein a cavity having a side opening, adapted to receive therein a metal plate and an insulation pad that constitute a keyboard part, the metal plate having a plurality of engaging members thereon and the insulation pad having a plurality of counterpart engaging members thereon which are engageable with the engaging members of the metal plate by means of a relative movement therebetween, the work table comprising a flat member on which the support plate is fixed, the work table further comprising first power cylinders that are mounted in such a way to have cylinder rods of the first power cylinders extendible toward the support plate, the cylinder rods having remote ends to which the holding plate is fixed to be in overlying relationship with the support plate to define therebetween a clamping space for accommodating the keyboard support tray therein, the holding plate being movable relative to the support plate by being driven by the first power cylinders, the holding plate comprising reference holes formed thereon, the support plate having a plurality of dwell pins provided thereon for correctly positioning the keyboard support tray thereon, the keyboard support tray having reference pins to allow the holding plate to be correctly positioned on and press the keyboard support tray by alignment of the reference pins with the reference holes of the holding plate when the holding plate is moved toward the support plate, the pushing mechanism comprising a base fixed to the work table and having second power cylinders fixed thereon with a movable block fixed to cylinder rods of the second power cylinders to be moved thereby toward the keyboard support tray, a micro-switch being provided on the work table at such a position to be triggerable by the holding plate that is moving toward the support plate to actuate the second power cylinders, wherein the downward movement of the holding plate is adapted to hold the metal plate and the insulation pad of the keyboard part in the cavity of the keyboard support tray that is supported on the support plate and a further downward movement of the holding plate triggers the micro-switch to actuate the second power cylinders to drive the movable block toward the keyboard support tray to contact and apply a pushing force to the metal plate through the side opening of the keyboard support tray, thus causing relative movement between the metal plate and the insulation pad to have the engaging members of the metal plate securely engage the counterpart engaging members of the insulation pad.

* * * * *